Oct. 29, 1957  A. N. IKNAYAN ET AL  2,811,190
PUNCTURE-SEALING PNEUMATIC ARTICLE
Filed May 19, 1954
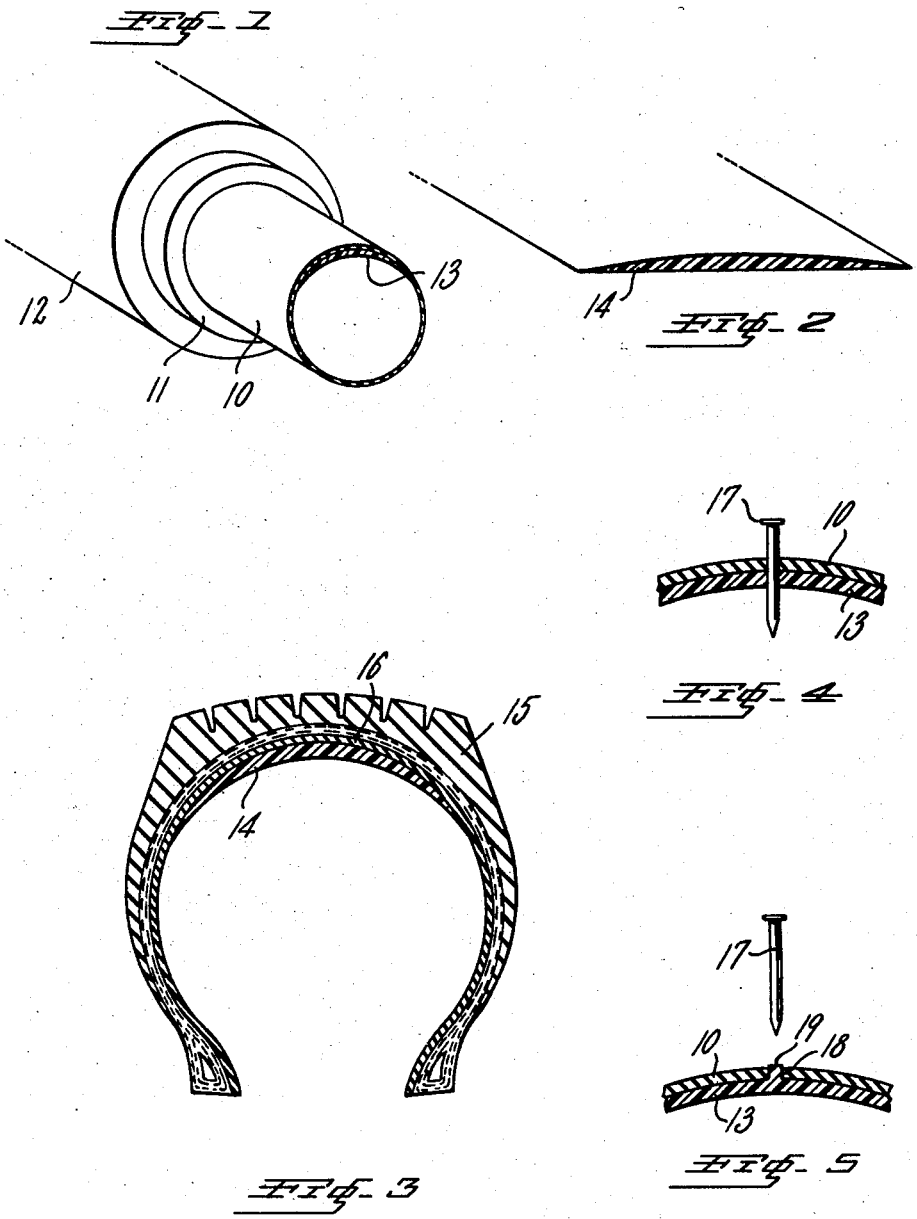
INVENTORS:
ALFRED N. IKNAYAN
LESTER C. PETERSON
HARVEY J. BATTS
BY
AGENT

United States Patent Office 2,811,190
Patented Oct. 29, 1957

2,811,190

PUNCTURE-SEALING PNEUMATIC ARTICLE

Alfred N. Iknayan, Grosse Pointe Farms, Mich., and Lester C. Peterson and Harvey J. Batts, Indianapolis, Ind., assignors to United States Rubber Company, New York, N. Y., a corporation of New Jersey Application May 19, 1954, Serial No. 430,774

1 Claim. (Cl. 152—347)

This invention relates to a puncture-sealing pneumatic article, and more particularly it relates to a pneumatic tire or inner tube containing at least in its crown area a layer of puncture-sealing material.

One object of the invention is to provide a puncture-sealing layer for a pneumatic tire or inner tube which will retain a precise desired balance of plastic and elastic properties throughout a prolonged period of use.

Another object of the invention is to provide a pneumatic tire or tube with a layer of puncture-sealant that is relatively resistant to a hardening effect due to diffusion of curative materials from adjacent sulfur-vulcanized portions of the tire or tube.

Still another object is the provision of a puncture-sealing material which is so formulated as to be capable of acquiring an exact but limited degree of cure in the course of the conventional vulcanizing cycle to which pneumatic tires or inner tubes are ordinarily subjected.

Additional objects of the invention include the provision of a sealant material that can be easily and conveniently formulated from readily available and economical materials, and that performs efficiently in the final tire assembly.

Additional objects and advantages of the invention will be made manifest in the following detailed description, which is intended to be read with reference to the accompanying drawing, wherein:

Fig. 1 is a largely diagrammatic perspective view of one method of forming an inner tube of the invention by an extrusion operation;

Fig. 2 is a fragmentary perspective view of a shaped portion of sealant material of the invention for use in preparing an inner tube by another method, or for use in preparing a pneumatic tire;

Fig. 3 is a transverse sectional view of a pneumatic tire embodying the invention; and, Figs. 4 and 5 are fragmentary transverse sectional views on an enlarged scale of an inner tube of the invention, illustrating its behavior upon being punctured.

The invention is based on the principle of compounding an essentially permanently plastic material with a lesser amount of a different material that is adapted to be vulcanized to a typical rubbery, elastic state. Such vulcanized, elastic material serves to impart to the otherwise permanently plastic material a certain degree of immobility and elasticity, whereby the plastic material is at once restrained in its proper operative location, and also is rendered just sufficiently elastic to perform the desired puncture-sealing function. The vulcanizing agent for the portion of the mixture to be converted into a rubbery, elastic state does not cause the permanently plastic portion of the mixture to become hardened or vulcanized because such permanently plastic portion is by its very nature not capable of undergoing vulcanization.

A particularly advantageous sealant composition embodying the foregoing principles is based upon a major portion, preferably from 80 parts to 97.5 parts, of rubbery polyisobutylene as the permanently plastic portion of the mixture, and a minor proportion, preferably correspondingly from 20 parts to 2.5 parts, of the polychloroprene or neoprene type of synthetic rubber as the constituent which is vulcanized to an elastic state for the purpose of imparting immobility and the combination of properties necessary for sealing action. The mixture further includes a vulcanizing agent for the vulcanizable constituent, in this case, neoprene. Although certain commercially available grades of neoprene rubber apparently already contain some ingredient that promotes cure of the neoprene, we typically additionally employ an added known vulcanizing agent for the neoprene such as a metallic oxide (e. g., zinc oxide or magnesium oxide) or an acidic halide, especially a chloride, of a metal, especially a heavy metal such as iron or tin, or any other vulcanizing agent for the neoprene, such as dinitrosobenzene. In all cases, the vulcanizing or curing aid for the neoprene of course has no curing action on the polyisobutylene, which is unvulcanizable.

The curing agent for the neoprene is employed in amounts that are conventional, typically within the range of from about ¼ part to 5 parts, based on 100 parts of the combined neoprene and polyisobutylene. The neoprene thus compounded is capable of attaining a substantially fully cured condition in the course of the heating cycle to which an inner tube or a pneumatic tire is subject in ordinary factory practice, and in this condition, the neoprene, when used in the specified amounts, provides a basis for the attainment of the desired balance of plastic and elastic properties in the final mixture. Certain of the metal halides that are known to exert a curing action on neoprene are disclosed in U. S. Patent 2,397,399 of Baird et al., and although those patentees prefer to use the metal halide curing agent in combination with an organic nitrogenous base, we do not ordinarily find it necessary to use such nitrogenous base in our formulation, but we can use the metal halide itself.

The rubbery polyisobutylene employed as the permanently plastic ingredient in the composition of the invention is of course a known type of synthetic polymer, commercially available under the trade name "Vistanex." This material is particularly well suited to use in the present invention because of its inertness. Polyisobutylene having a molecular weight 100,000 has been used in the invention with satisfactory results, although a molecular weight of 60,000 to 80,000 is preferable. Since the polyisobutylene is not affected by vulcanizing agents, it is immune to the gradual hardening action that might otherwise take place while the sealant is in use, as a consequence of the slow diffusion of residual sulfur curatives from the adjacent vulcanized rubber portions of the tire or tube into the sealant layer.

Referring to the drawing, there is illustrated in Fig. 1 a principal step in one method of preparing an inner tube embodying the invention. This method, as well as apparatus particularly well adapted for practicing such method, is disclosed and claimed in copending application Serial No. 363,874 of Mulbarger and Harris, filed June 24, 1953, now Patent No. 2,736,921. In accordance with such method an inner tube 10 is formed by extruding from a compound die 11 of an extruder 12 a conventional vulcanizable rubber inner tube stock, which is ordinarily a Butyl rubber stock compounded for sulfur vulcanization and including the usual organic accelerators. Simultaneously with the extrusion of the inner tube stock there is extruded an integral layer 13 of the plastic sealant material of the invention in a raw state, such layer being so disposed as to cover at least the crown area of the interior surface of the inner tube. The extruded assembly is thereafter cut into appropriate lengths and butt-spliced to form an annulus, and subsequently the assembly is disposed in the usual inner tube mold for vulcanization in the shape of an inner tube, all in accordance with conventional practice.

In place of forming the layer of plastic sealant integrally with the inner tube by a dual tubing operation, the plastic sealant may instead be formed into the shape of a strip 14, as shown in Fig. 2, by any conventional means such as extrusion or calendering, and such strip of plastic sealant may be employed to construct a laminated inner tube by any suitable conventional method, or by the particular method disclosed in application Serial No. 402,045 of Neill and Reed, filed January 4, 1954, now Patent No. 2,739,639. Also, the strip 14 may be employed to construct a puncture-sealing pneumatic tire, of the kind illustrated in Fig. 3. In Fig. 3, the layer of plastic sealant 14 is shown applied to the interior crown surface of a pneumatic tire 15 of the so-called tubeless type, such tire including on its interior band ply surface an additional layer 16 of air-retaining lining material.

The manner in which the plastic sealant material of the invention, after being subjected to vulcanizing conditions, performs the sealant function is illustrated in Figs. 4 and 5, wherein it is shown how a nail 17 or similar puncturing object, after passing through the rubber wall 10 and plastic sealant layer 13 of the inner tube, and being withdrawn therefrom leaves a hole 18 in the wall of the inner tube, which is filled up and sealed by a knob or plug 19 of the sealant material, which tends to be pulled out through the hole 18 as the puncturing nail 17 is withdrawn. It will be evident that this sealing action is dependent upon the provision and maintenance of a particular condition of elasticity and plasticity, as provided for in the present invention, and it will also be evident that it is essential for the sealant to remain in place in its proper operating position, in spite of the centrifugal and other forces that ordinarily tend to displace the plastic material. A filler is preferably included in the composition of the invention for the purpose of permitting smooth and satisfactory compounding and processing, by suppressing the nerve of the composition to a substantial extent. When suitably loaded with an appropriate filler, the mixture provides the desired balance of elastic and plastic properties, and fillers that may be used for this purpose may be any relatively inert, solid, finely powdered material, such as carbon black, clay, mica, calcium carbonate, precipitated hydrated silica, precipitated hydrated calcium silicate, zinc oxide, diatomaceous earth, wood flour or similar fillers known in the rubber compounding art. Usually a total of 20 to 150 parts, and preferably from about 30 to 50 parts, by weight of such filler material is employed to 100 parts of the mixture of neoprene and polyisobutylene. Carbon black is a preferred filler.

A softener or plasticizer is preferably included in the mixture, and it should be of the kind that the skilled rubber compounder refers to as non-migratory, that is, in the final assembly, the plasticizer should have a preference for remaining within the sealant layer with which it is compounded, rather than volatilize or diffuse into the material of the adjacent parts of the inner tube or tire. In this way, the properties of the sealant will be substantially maintained over a prolonged period of service life. The plasticizer is preferably of a somewhat sticky nature, to increase the tack of the material. Mineral oils, rosin oil, or other known plasticizers may be used. Preferred softeners are liquid tacky resinous materials of high molecular weight, such as polybutene, or synthetic resins such as the paracoumarone-indene type or polyterpene type. Such materials are well known to the skilled rubber compounder. When sufficient plasticizer is used to impart workability to the stock and to leave it in a softened condition, the mixture will be best suited to perform the sealant function. Usually from about 8 to 50 parts, and preferably from about 20 to 30 parts, of softener is sufficient for this purpose.

*Example*

| | Parts by Weight | | | | | |
|---|---|---|---|---|---|---|
| | 1 | 2 | 3 | 4 | 5 | 6 |
| Vistanex B-100 | 90 | 80 | 90 | 80 | 90 | 80 |
| Neoprene GN-AM-3 | 10 | 20 | 10 | 20 | 10 | 20 |
| Polyac | | | 1 | 1 | | |
| Zinc Oxide | | | | | 0.5 | 1.0 |
| Light Calcined Magnesia | | | | | 0.4 | 0.8 |

The Vistanex B-100 is a commercial grade of polyisobutylene having a molecular weight of about 100,000. The Neoprene GN-AM-3 is a commercial grade of rubbery polychloroprene. Polyac is a commercial preparation of dinitrosobenzene, which has a curing action on neoprene. The materials shown were mixed together, to form the six different stocks indicated, on a mill in the conventional manner. The plasticity of each mix was determined by the method described in India Rubber World, August 1953, page 626, with the following results.

| | Stock | | | | | |
|---|---|---|---|---|---|---|
| | 1 | 2 | 3 | 4 | 5 | 6 |
| Linhorst Plasticity | .0399 | .0321 | .0380 | .0379 | .0348 | .0310 |

The Linhorst plasticity values are expressed in inches, and are obtained on a 0.075 gauge sample molded for three minutes at 212° F. The plasticity is a 12 minute reading obtained with an eight pound weight at 212° F. in the Linhorst plastometer apparatus.

To demonstrate the effect of curing conditions on these compounds, samples of the stocks were heated for 30 minutes at 350° F., after which the plasticities were observed to be as follows:

| | 1 | 2 | 3 | 4 | 5 | 6 |
|---|---|---|---|---|---|---|
| Linhorst Plasticity | .0480 | .0731 | .0530 | .0630 | .0450 | .0670 |

It will be observed that in all cases the plasticity value has increased, due to the curing of the neoprene constituent of the mix. Any of these compounds, usually with the addition of 20–150 parts of filler and 8–50 parts of softener, provide sealant layers when incorporated in an inner tube or tubeless tire in accordance with the foregoing procedure. Thus, for example, stock 3 may be mixed with 75 parts of black iron oxide as a filler and 15 parts of Indopol H-300 (a commercial grade of polybutene) as a plasticizer.

The stocks shown are capable of being cured to the desired extent under the influence of the curing conditions employed in making tires or tubes. In the case of stocks 1 and 2, certain curative materials already present brought about the desired cure. In stocks 3 to 6 the added curative materials also acted on the neoprene.

In general, it may be stated that final sealant compounds in which the Linhorst plasticity is within the range of from 0.015 and 0.04 represent satisfactory sealants.

When inner tubes are prepared in accordance with the foregoing procedure, and road tested extensively under actual operating conditions, the inner tubes are found to seal punctures effectively. After extended periods of operation no plastic flow of the sealant takes place. The remarkableness of this in comparison to the usual sealant materials, will be appreciated when it is considered that it has heretofore been the practice to enclose the sealant material in various kinds of barriers or network restraining means, in order to prevent the sealant material from undergoing plastic flow. The undesirability of using such mechanical barriers will be apparent, both from the standpoint of complicating the building operation and reducing the effectiveness of the sealant layer, as well as from the standpoint of making the assembly thicker and heavier than would otherwise be desirable, with consequent increased heat build-up. In the present instance, the vulcanized constituent gives structure to the whole, thereby providing resistance to plastic flow. At the same time permanency of the desired properties is assured because the polyisobutylene is insensitive to any cure from migrating sulfur type curatives contained in the adjacent vulcanized rubber parts of the tire or tube. Since no cure is possible in the polyisobutylene phase of the compound, the basic plastic nature of the material remains unchanged. It will be understood that the conventional sulfur vulcanized rubber parts of the inner tube or tire contain residual products derived from the sulfur-bearing vulcanizing agents and accelerators originally included in such compounds, and these residual materials ordinarily would tend to migrate over a long period of time out of the vulcanized rubber parts and into the plastic sealant layer where, at the elevated temperatures prevailing in use, they would exert a pronounced hardening on the plastic sealant if the plastic portion thereof were vulcanizable, and render it worthless for its intended purpose after a time. The present invention affords a remarkably simple and effective means of forestalling this disadvantageous occurrence.

Having thus described our invention, what we claim and desire to protect by Letters Patent is:

A puncture-sealing pneumatic vulcanized rubber article having a layer of sealant material in at least its crown area comprised of a mixture of 20 to 150 parts of a powdered filler, 8 to 50 parts of a softener and 100 parts of a mixture of (1) from 80 to 97.5 parts of rubbery polyisobutylene having a molecular weight of 60,000 to 100,000, said polyisobutylene serving as a plastic component that is by nature essentially incapable of undergoing vulcanization under the influence of curatives diffusing from adjacent parts of said vulcanized rubber article into said sealant layer and that retains indefinitely its plastic nature under ordinary conditions of use, the said polyisobutylene in itself being subject to plastic flow such that it would not of itself remain in operable position under ordinary conditions of use, and (2) correspondingly from 20 to 2.5 parts of cured polychloroprene rubber which serves to give structure to the whole mixture, thereby providing resistance to plastic flow, the said sealant material having a Linhorst plasticity of from 0.015 to 0.04.

References Cited in the file of this patent

UNITED STATES PATENTS

| | | |
|---|---|---|
| 1,237,698 | Reuter | Aug. 21, 1917 |
| 1,244,236 | Oberfelder | Oct. 23, 1917 |
| 2,160,997 | Wiezevich | June 6, 1939 |
| 2,180,082 | Mueller-Cunradi | Nov. 14, 1939 |
| 2,454,283 | King | Nov. 23, 1948 |
| 2,541,550 | Sarbach et al. | Feb. 13, 1951 |
| 2,566,384 | Tilton | Sept. 4, 1951 |